Feb. 9, 1926. 1,572,339
E. Y. WALSH ET AL
TRUCK FOR TRAMWAY VEHICLES
Filed Feb. 12, 1924
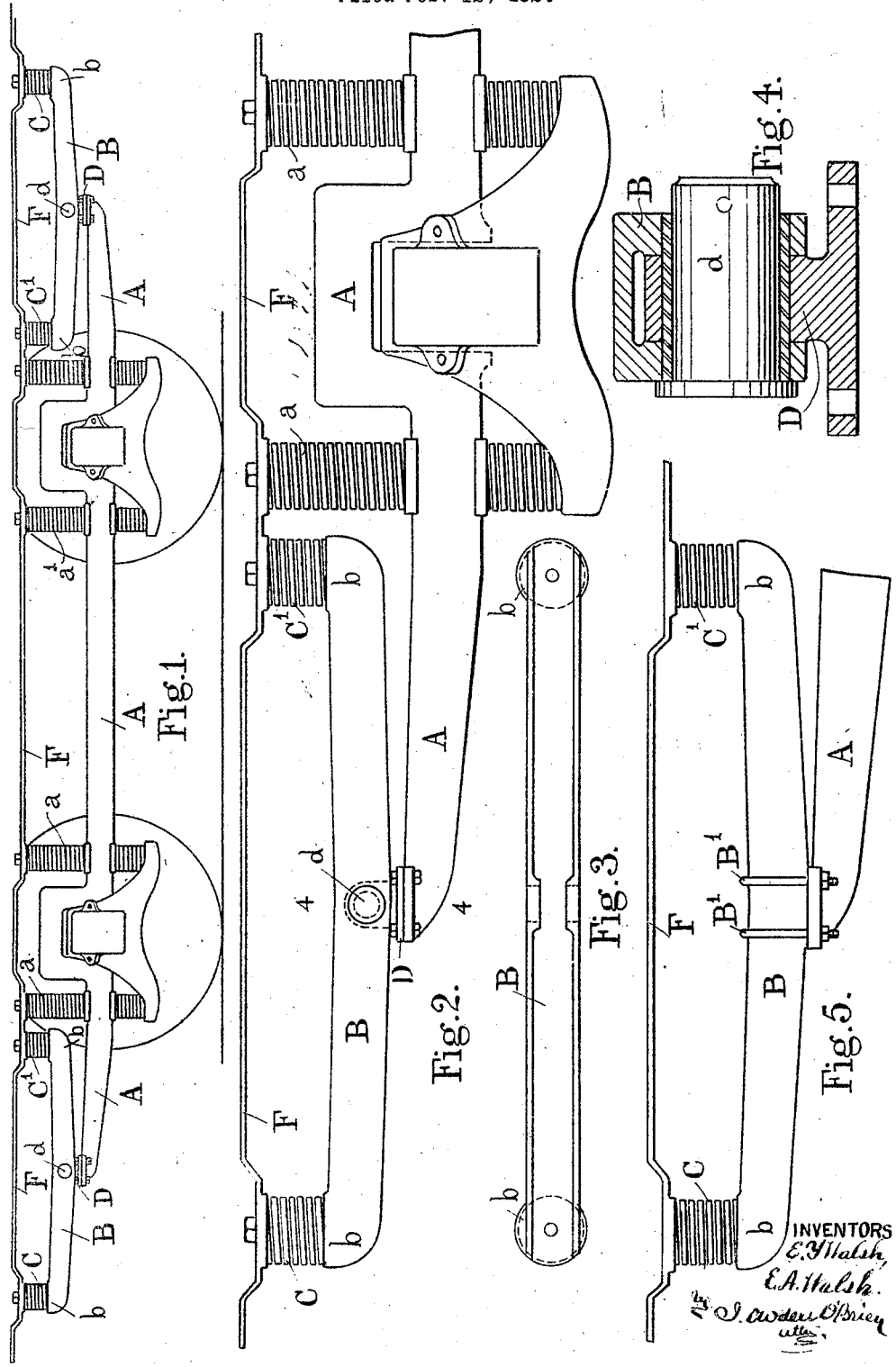

Patented Feb. 9, 1926.

1,572,339

UNITED STATES PATENT OFFICE.

EDWARD YATES WALSH AND EDWARD ANCHOR WALSH, OF ECCLES, ENGLAND.

TRUCK FOR TRAMWAY VEHICLES.

Application filed February 12, 1924. Serial No. 692,385.

*To all whom it may concern:*

Be it known that we, EDWARD YATES WALSH and EDWARD ANCHOR WALSH, both British subjects, residing at Eccles, county of Lancaster, England, have invented certain new and useful Improvements in Trucks for Tramway Vehicles, of which the following is a specification.

This invention relates to the trucks of tramway vehicles upon which the bodies are mounted upon springs and is designed to prevent the oscillation of the body known as galloping.

For this purpose it has been proposed to place elliptical or semi-elliptical springs between the truck side frame and the body to overhang the extreme ends of the truck side frames.

According to the invention a cantilever bracket provided with pockets, cups or attachments for springs at both ends is affixed to the present spring seatings at the ends of the side frames of the truck, and springs are placed between the ends of each of these brackets and the car body to support the ends of the body.

The invention will be fully described with reference to the accompanying drawings.

Fig. 1. is a side elevation of tramway truck.

Fig. 2. is a side elevation enlarged of one end of truck.

Fig. 3. is a plan from below of the cantilever B.

Fig. 4. is a transverse section on line 4—4 Fig. 2.

Fig. 5. is a side elevation enlarged of cantilever secured by straps.

The tramway vehicle truck is of ordinary construction with side frames A the body being supported by springs $a$ $a'$.

At each end of the side frame A at both sides of the truck we mount or attach a cantilever or cantilever bracket B making four for each truck or vehicle.

Each cantilever or cantilever bracket B is preferably made of channel form and provided at one or both ends with cups or pockets $b$ to receive springs C C'.

The cantilevers B may be mounted on bearing blocks D bolted to the ends of the truck frame A and be secured thereto by pivots or pins $d$ or by trunnions or rockers so that they may rock thereon to adapt themselves to the movements of the truck and body.

The cantilevers B may be rigidly attached to the ends of the truck and secured by straps shown at B' or by bolts. Springs C C' are placed between the ends of the cantilevers B and the chord F of the body. These springs may be spiral as shown or involute or elliptical or a combination of these.

What we claim as our invention and desire to protect by Letters Patent is:—

In a truck for tramway vehicles the combination with the side frames A and rocking cantilever B of channel form, of cups $b$ springs C C' fitted therein between the chords F affixed to the underside of the vehicle body, springs at both sides of the axle boxes interposed between the body of the vehicle and the frame A and springs below the frame A at both sides of axle boxes interposed between it and straps passed round the axle boxes.

In testimony whereof we have hereunto set our hands.

E. Y. WALSH.
EDWARD A. WALSH.